US012775352B2

(12) United States Patent
Kim et al.

(10) Patent No.: US 12,775,352 B2
(45) Date of Patent: Oct. 27, 2026

(54) TOUCH DISPLAY DEVICE

(71) Applicant: LG Display Co., Ltd., Seoul (KR)

(72) Inventors: Sang Jin Kim, Paju-si (KR); In Tae Ko, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 19/326,560

(22) Filed: Sep. 11, 2025

(65) Prior Publication Data

US 2026/0010250 A1 Jan. 8, 2026

Related U.S. Application Data

(63) Continuation of application No. 18/389,095, filed on Nov. 13, 2023, now Pat. No. 12,436,632, which is a continuation of application No. 17/976,543, filed on Oct. 28, 2022, now Pat. No. 11,853,495.

(30) Foreign Application Priority Data

Dec. 28, 2021 (KR) ........................ 10-2021-0190428

(51) Int. Cl.
*G06F 3/041* (2006.01)
*G06F 3/044* (2006.01)

(52) U.S. Cl.
CPC ........ *G06F 3/0412* (2013.01); *G06F 3/04164* (2019.05); *G06F 3/0443* (2019.05); *G06F 3/0446* (2019.05); *G06F 2203/04104* (2013.01)

(58) Field of Classification Search
CPC ............. G06F 3/041662; G06F 3/0446; G06F 3/04164; G06F 3/0412
USPC .................................................. 345/173, 174
See application file for complete search history.

(56) References Cited

U.S. PATENT DOCUMENTS

2012/0092273 A1* 4/2012 Lyon .................. G06F 3/04164 345/173
2020/0097127 A1 3/2020 Kim et al.
2020/0301544 A1* 9/2020 Jeong .................... G06F 3/0443
2021/0149524 A1 5/2021 Bang
(Continued)

FOREIGN PATENT DOCUMENTS

CN 112817473 A 5/2021
CN 113707685 A 11/2021
(Continued)

*Primary Examiner* — Calvin C Ma
(74) *Attorney, Agent, or Firm* — Birch, Stewart, Kolasch & Birch, LLP

(57) ABSTRACT

A display device can include a display area on a substrate and a non-display area located outside the display area on the substrate, a transistor in the display area; a planarization film on the transistor, a light emitting element on the planarization film in the display area and connected to the transistor, the light emitting element including a first electrode, a second electrode, and an emission layer between the first electrode and the second electrode, an encapsulation film on the light emitting element, at least two dams disposed along a periphery of the display area, a touch buffer film on the encapsulation film, a touch insulating film on the touch buffer film, a touch electrode on the touch insulating film, and a touch electrode connection line disposed under the touch electrode and configured to connect to the touch electrode in the non-display area via at least two contact holes.

20 Claims, 6 Drawing Sheets

(56) References Cited

U.S. PATENT DOCUMENTS

| | | | | |
|---|---|---|---|---|
| 2021/0365146 | A1 | 11/2021 | Kim et al. | |
| 2022/0320189 | A1 | 10/2022 | Lee et al. | |
| 2023/0057191 | A1* | 2/2023 | Kim | H10K 50/844 |

FOREIGN PATENT DOCUMENTS

| | | | |
|---|---|---|---|
| KR | 10-1073293 | B1 | 10/2011 |
| KR | 10-2018-0136082 | A | 12/2018 |
| KR | 10-2019-0048784 | A | 5/2019 |
| KR | 10-2021-0059833 | A | 5/2021 |
| KR | 10-2021-0081701 | A | 7/2021 |
| KR | 10-2021-0145026 | A | 12/2021 |

* cited by examiner

TOUCH DISPLAY DEVICE

CROSS-REFERENCE TO RELATED APPLICATIONS

This application is a Continuation application of U.S. patent application Ser. No. 18/389,095, filed on Nov. 13, 2023, which is a Continuation application of U.S. patent application Ser. No. 17/976,543, filed on Oct. 28, 2022 (now U.S. Pat. No. 11,853,495, issued on Dec. 26, 2023), which claims priority to Korean Patent Application No. 10-2021-0190428, filed on Dec. 28, 2021 in the Republic of Korea, the entire contents of all these applications are hereby expressly incorporated by reference into the present application.

BACKGROUND OF THE DISCLOSURE

Field

The present disclosure relates to a touch display device.

Discussion of the Related Art

With the growth of information society, a demand for a display device that displays an image has increased. According to this demand, various display devices, such as a liquid crystal display device and an organic light emitting display device, are used.

These display devices can provide various functions to users to enhance user experience. Among such functions, a display device can recognize a user's touch on a display panel and can perform input processing based on the recognized touch.

For example, a plurality of touch electrodes can be disposed in an active area of the display panel. The display device can sense a user's touch based on a change in the capacitance of the touch electrodes generated due to the user's touch.

Particularly, in an organic light emitting display device, components of a touch element can be formed on or under an encapsulation film configured to protect an emission portion of the organic light emitting display device. For instance, touch driving electrodes providing a touch driving signal transmission channel and touch sensing electrodes providing a touch recognition signal reception channel can be formed at the upper surface and/or lower surface of the encapsulation film configured to cover the display elements of an electroluminescent display device.

Generally, in a display area of the display device, the encapsulation film is disposed in order to protect pixels of the display area. Here, at least some of films constituting the encapsulation film can extend to a non-display area, and can be disposed on a dam formed in the non-display area in order to prevent overflow of the encapsulation film.

As a result, the touch electrode and touch lines may need to be formed on the encapsulation film that is disposed on the dam in the non-display area. In order to form such touch electrode and touch lines, a photoresist (PR) is applied to the encapsulation film and then patterning is performed. However, the photoresist (PR) can be more thinly applied to some areas due to the height of the dam. As such, during a mask process, some of the touch lines can be etched unintentionally or undesirably, whereby pattern defects can occur.

SUMMARY OF THE DISCLOSURE

Accordingly, the present disclosure is directed to a touch display device that substantially obviates one or more problems due to limitations and disadvantages of the related art.

Objects of the present disclosure devised to address the problems are not limited to the aforementioned objects, and other unmentioned objects will be clearly understood by those skilled in the art based on the following detailed description of the present disclosure.

To achieve these objects and other advantages and in accordance with the purpose of the invention, as embodied and broadly described herein, a touch display device can include a substrate having a display area in which a plurality of pixels are disposed and a non-display area around the display area. The touch display device can include a blocking structure disposed in the non-display area, the blocking structure being configured to surround the display area. The touch display device can include an encapsulation film configured to cover the display area and the non-display area. The touch display device can include a plurality of first touch electrodes and a plurality of second touch electrodes disposed on the encapsulation film in the display area, the plurality of first touch electrodes extending in a first direction, the plurality of second touch electrodes extending in a second direction.

Further, according to an aspect of the present disclosure, the touch display device can include a first touch line disposed on the encapsulation film in the non-display area, the first touch line being connected to the plurality of first touch electrodes, and a second touch line disposed on the first touch line, the second touch line being connected to the plurality of first touch electrodes. The touch display device can include a touch insulating film located between the first touch line and the second touch line. The touch insulating film can include a contact hole on the blocking structure. The first touch line and the second touch line can be connected to each other via the contact hole.

Details of other embodiments are included in the detailed description and the drawings.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Figure 1:
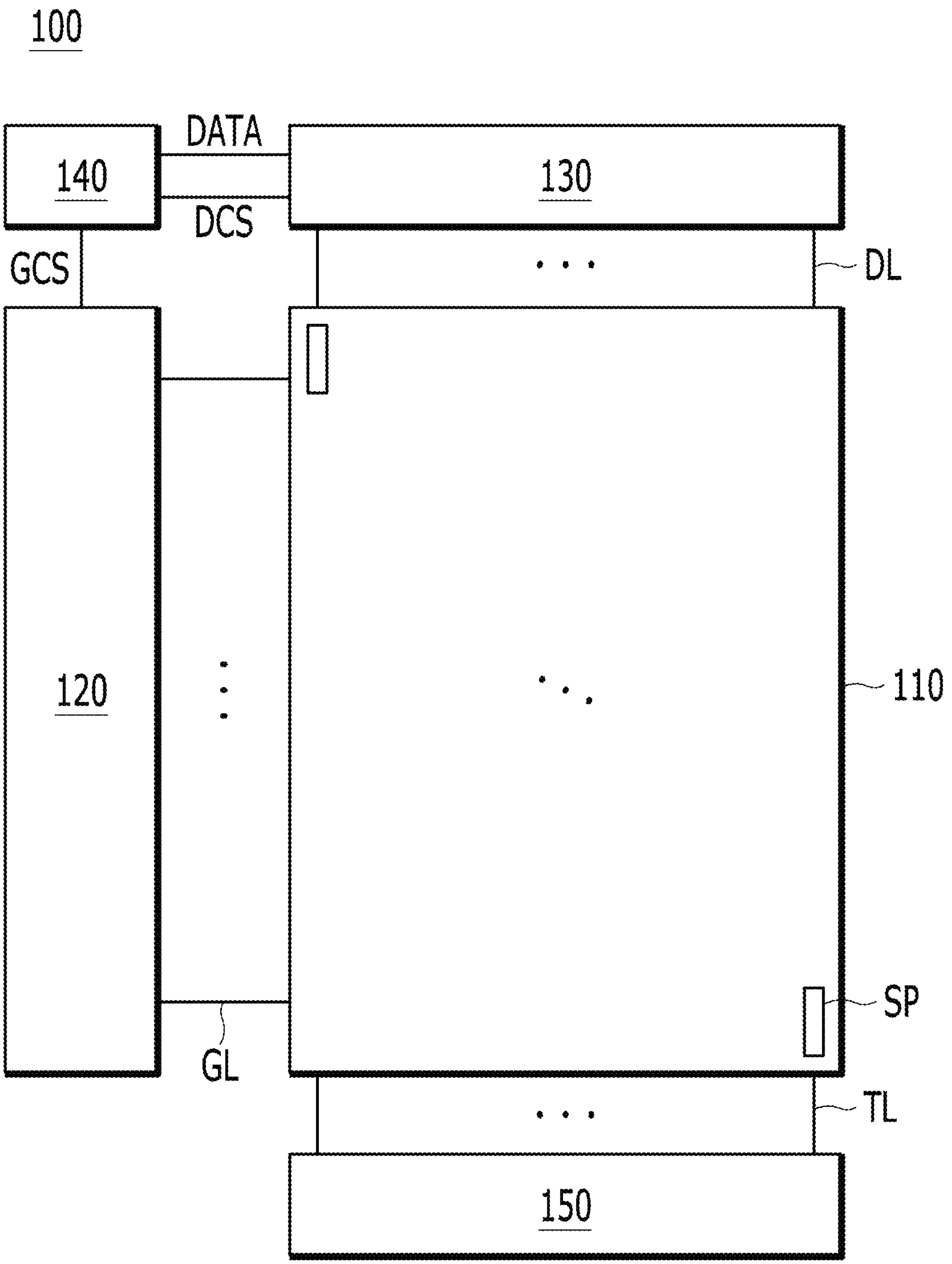
FIG. 1 is a view schematically showing the construction of a display device according to an embodiment of the present disclosure.

Advantages and features of the present disclosure and methods of achieving the same will be more clearly understood from embodiments described below with reference to the accompanying drawings. However, the present disclosure is not limited to the following embodiments and can be implemented in various different forms. The embodiments are provided merely to complete the disclosure of the present disclosure and to fully inform a person having ordinary skill in the art to which the present disclosure pertains of the category of the invention. The present disclosure is defined only by the category of the claims.

In the drawings for explaining the embodiments of the present disclosure, for example, the illustrated shape, size, ratio, angle, and number are given by way of example, and thus, are not limitative of the disclosure of the present disclosure. Throughout the present specification, the same reference numerals designate the same constituent elements. In addition, in the following description of the present disclosure, a detailed description of known functions and configurations incorporated herein will be omitted when it may make the subject matter of the present disclosure rather unclear. The terms “comprises”, “includes”, and “has”, used in this specification, do not preclude the presence or addition of other elements unless used along with the term “only.” The singular forms are intended to include the plural forms as well, unless the context clearly indicates otherwise.

In the interpretation of constituent elements, the constituent elements are interpreted as including an error range even if there is no explicit description thereof.

When describing positional relationships, for example, when the positional relationship between two parts is described using “on”, “above”, “under”, “below”, “beside”, or the like, one or more other parts can be located between the two parts unless the term “directly” or “closely” is used therewith.

When the temporal relationship between two actions is described using “after”, “subsequently”, “next”, “before”, or the like, the actions may not occur in succession unless the term “immediately” or “directly” is used therewith.

The case in which an element or a layer is provided on another element or another layer includes both the case in which an element or a layer is directly provided on another element or another layer and the case in which an element or a layer is provided on another element or another layer in the state in which a further element or a further layer is disposed therebetween. In the description of the various embodiments of the present disclosure, although terms such as, for example, “first” and “second” can be used to describe various elements, these terms are merely used to distinguish the same or similar elements from each other and may not define order or sequence. Therefore, in the present specification, an element modified by “first” can be the same as an element modified by “second” within the technical scope of the present disclosure unless mentioned otherwise. Further, the terms “present disclosure” or “invention” can be interchangeably used. The terms “film” and “layer” can be interchangeably used.

Throughout the specification, the same reference symbols denote the same elements.

The size and thickness of each element shown in the drawings are provided for convenience of description, and the present disclosure is not limited to the size and thickness of each element shown.

The respective features of the various embodiments of the present disclosure can be partially or wholly coupled to and combined with each other, and various technical linkages therebetween and operation methods thereof are possible. These various embodiments can be performed independently of each other, or can be performed in association with each other.

Terms used in the following description, which are those defined taking into consideration functions realized in accordance with the present disclosure, can vary depending upon the intention of users or operators or upon usual practices. Therefore, the definition of such terms must be made based on the disclosure of this specification.

As mentioned above, the terms such as “first”, “second”, “third”, etc. are used in order to distinguish between elements for each embodiment, and embodiments are not limited thereto. Consequently, the same terms can designate other elements depending on embodiment.

Embodiments of the present disclosure will be described based on an organic light emitting display device. However, the embodiments of the present disclosure are not limited to the organic light emitting display device, and can be applied to other various display devices, including an inorganic light emitting display device including an inorganic light emitting material. For example, the embodiments of the present disclosure can be applied to a quantum dot display device. In addition, the embodiments of the present disclosure can be applied to various kinds of devices capable of performing inspection using an inspection device, not the display device.

Further, the embodiments of the present disclosure can also be applied to other types of electronic devices where a touch sensing function is provided, such as a navigation device, a mobile terminal, a wearable electronic device, etc.

Hereinafter, embodiments of the present disclosure will be described in detail with reference to the accompanying drawings. All the components of each touch display device according to all embodiments of the present disclosure are operatively coupled and configured.

FIG. 1 is a view schematically showing the construction of a touch display device according to an embodiment of the present disclosure.

Referring to FIG. 1, a touch display device 100 according to the embodiment of the present disclosure can include a display panel 110, a gate driving circuit 120, a data driving circuit 130, a timing controller 140, and a touch driving circuit 150 configured to sense touches on the display panel 110.

In the display panel 110, a plurality of gate lines GL and a plurality of data lines DL are disposed, and a plurality of subpixels SP are disposed at the intersections between the gate lines GL and the data lines DL.

Further, in the display panel 110, a plurality of touch electrodes can be disposed or mounted, and a plurality of touch lines TL configured to electrically connect the touch electrodes to the touch driving circuit 150 can be disposed.

The construction for display driving in the display device 100 will be described first. The gate driving circuit 120 controls driving timing of the subpixels SP disposed in the display panel 110. In addition, the data driving circuit 130 supplies data voltages corresponding to image data to the subpixels SP. As a result, the subpixels SP emit light with brightness corresponding to the gradation of the image data to display an image.

Specifically, the gate driving circuit 120 is controlled by the timing controller 140 and sequentially outputs scan signals to the plurality of gate lines GL disposed in the display panel 110 to control the driving timing of the plurality of subpixels SP.

The gate driving circuit 120 can include at least one gate driving integrated circuit (GDIC), and can be located at only one side of the display panel 110 or both or multiple sides of the display panel 110 depending on a driving mode. Alternatively, the gate driving circuit 120 can be directly mounted in a bezel area of the display panel 110 so as to be implemented in a gate in panel (GIP) form.

The data driving circuit 130 receives digital image data DATA from the timing controller 140 and converts the image data DATA into analog data voltages. Then the data driving circuit 130 outputs the data voltages to the respective data lines DL based on timing at which scan signals are applied through the gate lines GL, whereby the subpixels SP express brightness based on the data voltages.

The data driving circuit 130 can include at least one source driving integrated circuit (SDIC).

The timing controller 140 supplies various control signals to the gate driving circuit 120 and the data driving circuit 130 and controls the operations of the gate driving circuit 120 and the data driving circuit 130.

The timing controller 140 allows the gate driving circuit 120 to output a scan signal based on timing implemented in each frame, converts image data received from the outside (e.g., an external device or a host system) so as to correspond to a data signal format used in the data driving circuit 130, and outputs the converted image data DATA to the data driving circuit 130.

The timing controller 140 receives various timing signals including a vertical synchronization signal, a horizontal synchronization signal, an input data enable signal, and a clock signal from the outside (e.g., a host system) together with the image data DATA.

The timing controller 140 can generate a data control signal DCS and a gate control signal GCS using the various timing signals received from the outside, and can output the data control signal DCS and the gate control signal GCS to the data driving circuit 130 and the gate driving circuit 120, respectively.

As an example, the timing controller 140 outputs various gate control signals GCS including a gate start pulse, a gate shift clock, and a gate output enable signal in order to control the gate driving circuit 120.

Here, the gate start pulse controls an operation start timing of at least one gate driving integrated circuit constituting the gate driving circuit 120. The gate shift clock, which is a clock signal commonly input to the one or more gate driving integrated circuit(s), controls shift timing of a scan signal. The gate output enable signal designates timing information of the one or more gate driving integrated circuit(s).

In addition, the timing controller 140 outputs various data control signals DCS including a source start pulse, a source sampling clock, and a source output enable signal in order to control the data driving circuit 130.

Here, the source start pulse controls a data sampling start timing of at least one source driving integrated circuit constituting the data driving circuit 130. The source sampling clock is a clock signal for controlling data sampling timing in the source driving integrated circuit. The source output enable signal controls output timing of the data driving circuit 130.

The touch display device 100 can further include a power management integrated circuit configured to supply various voltages or currents to the display panel 110, the gate driving circuit 120, the data driving circuit 130, and the touch driving circuit 150 or to control various voltages or currents to be supplied.

At this time, the touch display device 100 can further include at least one printed circuit board (PCB) for circuit connection between the touch driving circuit 150 and other devices/components.

At this time, the other side (or another side) of a film having the touch driving circuit 150 mounted thereon can be connected to the one or more printed circuit boards (PCB). For example, one side of the film having the touch driving circuit 150 mounted thereon can be electrically connected to the display panel 110, and the other side (or another side) of the film can be electrically connected to the printed circuit board (PCB).

Meanwhile, when an encapsulation film is formed on the display panel 110 and touch electrodes are disposed thereon, a capacitance for driving the touch electrodes can be increased. As a result, it can be helpful to increase the level of a touch driving signal for driving the touch electrodes. To this end, a level shifter can be further provided between the touch driving circuit 150 and the display panel 110 in order to control the level of the touch driving signal.

Each subpixel SP is defined by an intersection area formed by the intersection of one gate line GL and one data line DL. A liquid crystal or light emitting element(s) can be provided in the display panel 110 depending on the type of the touch display device 100.

As an example, when the display device 100 is a liquid crystal display device, the display device 100 includes a light source such as a backlight unit, which is configured to radiate light to the display panel 110, and a liquid crystal disposed at each subpixel SP of the display panel 110. Alignment or positioning of the liquid crystal molecules can be adjusted by an electric field formed as a data voltage is applied to each subpixel SP, whereby an image can be displayed with brightness based on the data voltages.

For the liquid crystal display device, the display panel 110 can include a liquid crystal layer formed between two substrates, and can be operated in any known mode, such as a TN (Twisted Nematic) mode, a VA (Vertical Alignment) mode, an IPS (In-Plane Switching) mode, and an FFS (Fringe-Field Switching) mode. For an electroluminescent display device, on the other hand, the display panel 110 can be implemented as a top emission type panel, a bottom emission type panel, or a dual emission type panel.

Meanwhile, in addition to the displaying function, the touch display device 100 according to the embodiment of the present disclosure can provide a touch function. The touch display device 100 can detect user touches on the display panel 110 using the touch electrodes and the touch driving circuit 150 included in the display panel 110, and can process operations/functions corresponding to the user touches.

Figure 2:
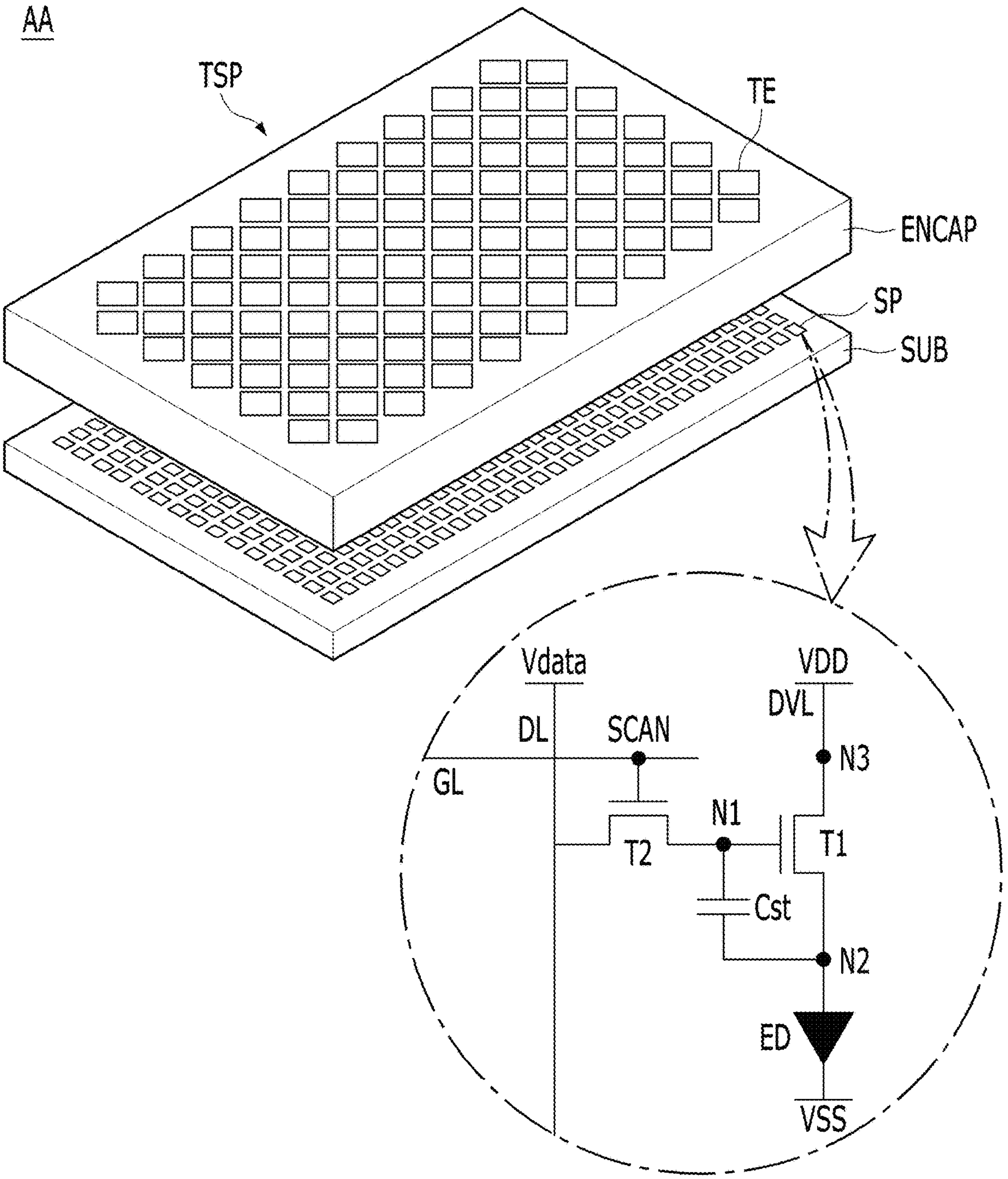
FIG. 2 is a view illustratively showing a structure in which a touch screen panel is mounted in a display panel of the display device according to the embodiment of the present disclosure.

FIG. 2 is a view illustratively showing a structure in which a touch screen panel is mounted in the display panel of the touch display device according to the embodiment of the present disclosure. The display panel 110 of FIG. 1 can have the configuration of the display panel of FIG. 2.

Referring to FIG. 2, in the touch display device 100 according to the embodiment of the present disclosure, the plurality of subpixels SP can be arranged on a substrate SUB in a display area AA of the display panel 110.

Each subpixel SP can include a light emitting element ED, a first transistor T1 configured to drive the light emitting element ED, a second transistor T2 configured to transmit a data voltage Vdata to a first node N1 of the first transistor T1, and a storage capacitor Cst configured to maintain uniform voltage during one frame.

The first transistor T1 can include the first node N1, to which a data voltage Vdata is applied through the second transistor T2, a second node N2 electrically connected to the light emitting element ED, and a third node N3, to which a driving voltage VDD is applied from a driving voltage line DVL. The first node N1 can be a gate node, the second node N2 can be a source node or a drain node, and the third node N3 can be the drain node or the source node. The first transistor T1 is a driving transistor configured to drive the light emitting element ED.

The light emitting element ED can include a first electrode (e.g., an anode), an emission layer, and a second electrode (e.g., a cathode). The first electrode can be electrically connected to the second node N2 of the first transistor T1, and a ground voltage VSS can be applied to the second electrode of the light emitting element ED.

In the light emitting element ED, the emission layer can be an organic emission layer including an organic material. In this case, the light emitting element ED can be an organic light emitting diode.

The second transistor T2 is on-off controlled by a scan signal SCAN applied through the corresponding gate line GL, and can be electrically connected between the first node N1 of the first transistor T1 and the corresponding data line DL. The second transistor T2 can be a switching transistor.

When the second transistor T2 is turned on by the scan signal, a data voltage Vdata supplied through the data line DL is transmitted to the first node N1 of the first transistor T1.

The storage capacitor Cst can be electrically connected between the first node N1 and the second node N2 of the first transistor T1.

Each subpixel SP can have a 2T1C structure including two transistors T1 and T2 and one capacitor Cst. Depending on circumstances or desired configurations, each subpixel can further include one or more transistors and/or one or more capacitors.

The storage capacitor Cst can be an external capacitor provided outside the first transistor T1, not a parasitic capacitor that can be provided between the first node N1 and the second node N2 of the first transistor T1.

Each of the first transistor T1 and the second transistor T2 can be an n-type transistor or a p-type transistor.

Meanwhile, for each subpixel SP, circuit elements, such as the light emitting element ED, two or more transistors T1 and T2, and one or more capacitors Cst, are disposed in the display panel 110. Since the circuit elements have low resistance to external moisture or oxygen, an encapsulation film ENCAP configured to prevent permeation of external moisture or oxygen into the circuit elements can be disposed in the display panel 110.

In the touch display device 100 according to the embodiment of the present disclosure, a touch screen panel TSP can be mounted in the display panel 110 in a state of being formed on the encapsulation film ENCAP. For example, in the touch display device 100, a plurality of touch electrodes TE constituting the touch screen panel TSP can be disposed on the encapsulation film ENCAP to constitute the display panel 110. That is, the display panel 100 can be or include the touch screen panel TSP that includes the subpixels SP and the touch electrodes TE.

The touch display device 100 can sense touches in a capacitance-based touch sensing mode, for example, in a mutual capacitance mode or a self-capacitance mode.

In the mutual-capacitance-based touch sensing mode, the plurality of touch electrodes TE can be divided into a touch driving electrode, to which through a touch driving signal is applied through a touch driving line, and a touch sensing electrode configured to sense a touch sensing signal through a touch sensing line, where the touch sensing electrode forms capacitance together with the touch driving electrode. At this time, the touch driving line and the touch sensing line can be referred to as touch lines, and the touch driving signal and the touch sensing signal can be referred to as touch signals.

At this time, the area of the touch driving electrode, to which the touch driving signal is applied, and the area of the touch sensing electrode, to which the touch sensing signal is transmitted, can be equal to or different from each other in size, shape, configuration, etc.

For example, when it is desirable to relatively reduce parasitic capacitance due to the touch sensing electrode (to which the touch sensing signal is transmitted), the size of the area of the touch sensing electrode can be formed so as to be less than the size of the area of the touch driving electrode. In this case, a ratio of the size of the area of the touch driving electrode (to which the touch driving signal is applied) to the size of the area of the touch sensing electrode (to which the touch sensing signal is transmitted), can be in the range of 5:1 to 2:1. As an example, a ratio of the size of the area of the touch driving electrode to the size of the area of the touch sensing electrode can be 4:1.

In the mutual-capacitance-based touch sensing mode, when there is a touch, touch coordinates are detected based on a change in mutual capacitance generated between the touch driving electrode and the touch sensing electrode depending on whether there is a pointer, such as a finger or a pen.

In the self-capacitance-based touch sensing mode, each touch electrode TE functions as both the touch driving electrode and the touch sensing electrode. For example, a touch driving signal is applied to the touch electrode TE through one touch line, and a touch sensing signal transmitted from the touch electrode TE to which the touch driving signal has been applied is received through the same touch line. In the self-capacitance-based touch sensing mode, therefore, there is no division or difference between the touch driving electrode and the touch sensing electrode and no division or difference between the touch driving line and the touch sensing line.

Further, in the self-capacitance-based touch sensing mode, when there is a touch, touch coordinates are detected based on a change in capacitance generated between a pointer (e.g., a finger or a pen) and the touch electrode TE.

The touch display device 100 of the present application preferably can sense touches in the mutual-capacitance-based touch sensing mode or the self-capacitance-based touch sensing mode, but can sense touches in other manners.

Figure 3:
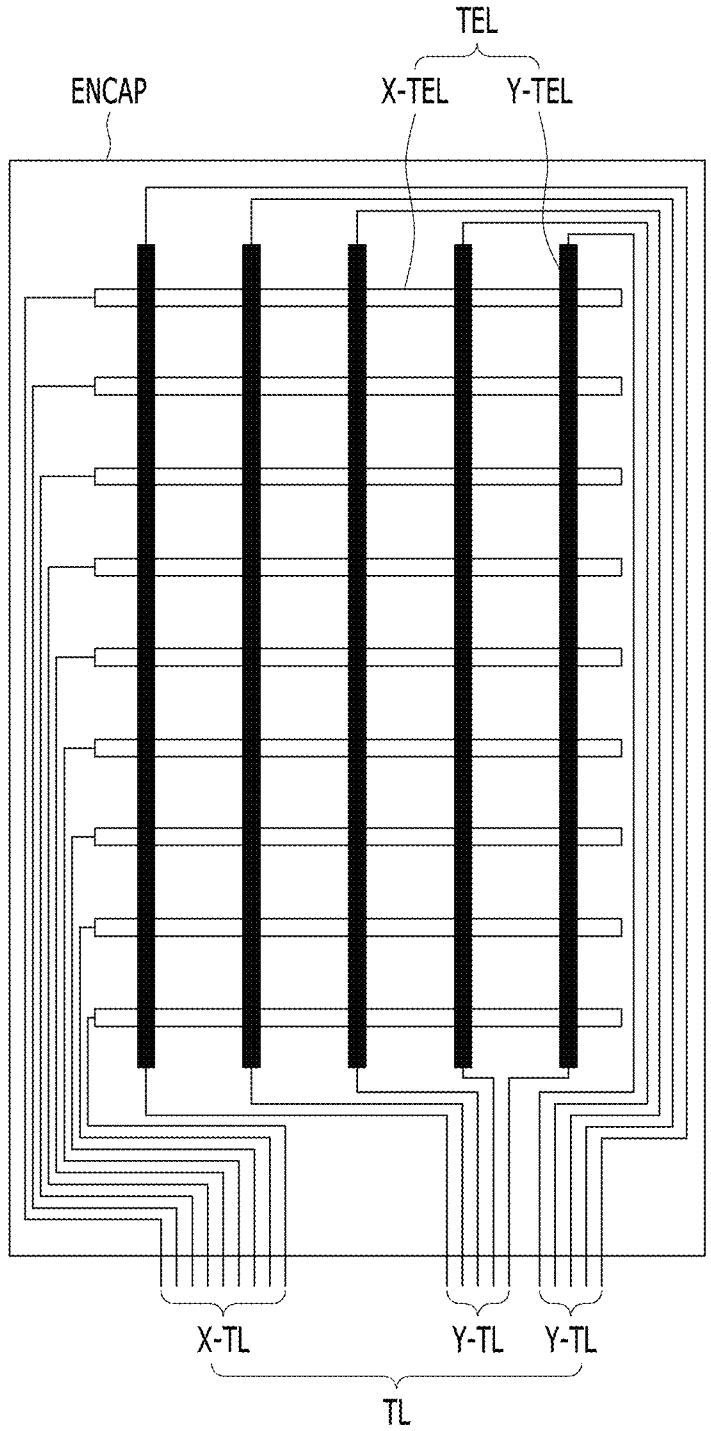
FIG. 3 is a view illustratively showing a mutual-capacitance-based touch sensing structure in the display device according to the embodiment of the present disclosure.

FIG. 3 is a view illustratively showing a mutual-capacitance-based touch sensing structure in the touch display device according to the embodiment of the present disclosure.

Referring to the example of FIG. 3, the mutual-capacitance-based touch sensing structure in the touch display device 100 according to the embodiment of the present disclosure can include a plurality of X-touch electrode lines X-TEL and a plurality of Y-touch electrode lines Y-TEL. Here, the plurality of X-touch electrode lines X-TEL and the plurality of Y-touch electrode lines Y-TEL can be located on the encapsulation film ENCAP.

The plurality of X-touch electrode lines X-TEL can be disposed in a first direction, and the plurality of Y-touch electrode lines Y-TEL can be disposed in a second direction different from the first direction.

In this specification, the first direction and the second direction can be relatively different directions. As an example, the first direction can be an x-axis direction, and the second direction can be a y-axis direction. On the contrary, the first direction can be the y-axis direction, and the second direction can be the x-axis direction.

In addition, the first direction and the second direction may or may not be perpendicular to each other.

The plurality of X-touch electrode lines X-TEL can be constituted by several X-touch electrodes electrically connected to each other, and the plurality of Y-touch electrode lines Y-TEL can be constituted by several Y-touch electrodes electrically connected to each other.

Here, the plurality of X-touch electrodes and the plurality of Y-touch electrodes are electrodes that are included in the plurality of touch electrodes and that have different roles (functions). For example, the plurality of X-touch electrodes constituting the plurality of X-touch electrode lines X-TEL can be touch driving electrodes, and the plurality of Y-touch electrodes constituting the plurality of Y-touch electrode lines Y-TEL can be touch sensing electrodes. In this case, the plurality of X-touch electrode lines X-TEL correspond to touch driving electrode lines, and the plurality of Y-touch electrode lines Y-TEL correspond to touch sensing electrode lines.

In another example, the plurality of X-touch electrodes constituting the plurality of X-touch electrode lines X-TEL can be touch sensing electrodes, and the plurality of Y-touch electrodes constituting the plurality of Y-touch electrode lines Y-TEL can be touch driving electrodes. In this case, the plurality of X-touch electrode lines X-TEL correspond to touch sensing electrode lines, and the plurality of Y-touch electrode lines Y-TEL correspond to touch driving electrode lines.

A touch sensor metal for touch sensing can include a plurality of touch lines TL in addition to the plurality of X-touch electrode lines X-TEL and the plurality of Y-touch electrode lines Y-TEL.

The plurality of touch lines TL can include one or more X-touch lines X-TL connected to the plurality of X-touch electrode lines X-TEL, and one or more Y-touch lines Y-TL connected to the plurality of Y-touch electrode lines Y-TEL.

Each of the plurality of X-touch electrode lines X-TEL can include a plurality of X-touch electrodes (e.g., X-TE) disposed in the same row (or the same column), and one or more X-touch electrode connection lines (e.g., X-CL) electrically connecting the plurality of X-touch electrodes to each other. Here, an X-touch electrode connection line connecting two (or more) adjacent X-touch electrodes can be a metal (or metal layer) integrated with the two adjacent X-touch electrodes or can be a metal (or metal layer) connected to the two adjacent X-touch electrodes via a contact hole.

Each of the plurality of Y-touch electrode lines Y-TEL can include a plurality of Y-touch electrodes (e.g., Y-TE) disposed in the same column (or the same row), and one or more Y-touch electrode connection lines (e.g., Y-CL) electrically connecting the plurality of Y-touch electrodes to each other. Here, a Y-touch electrode connection line connecting two (or more) adjacent Y-touch electrodes can be a metal (or metal layer) integrated with the two adjacent Y-touch electrodes or can be a metal (or metal layer) connected to the two adjacent Y-touch electrodes via a contact hole.

The X-touch electrode connection line and the Y-touch electrode connection line can intersect each other at the intersection between the X-touch electrode line X-TEL and the Y-touch electrode line Y-TEL (the touch electrode line intersection).

When the X-touch electrode connection line and the Y-touch electrode connection line intersect each other at the touch electrode line intersection, as described above, it is preferable for the X-touch electrode connection line and the Y-touch electrode connection line to be located on different layers. In order to dispose the plurality of X-touch electrode lines X-TEL and the plurality of Y-touch electrode lines Y-TEL so as to intersect each other, therefore, the plurality of X-touch electrodes, the plurality of X-touch electrode connection lines, the plurality of Y-touch electrodes, and the plurality of Y-touch electrode connection lines can be located on two or more layers (e.g., two or more different layers).

The plurality of X-touch electrode lines X-TEL are electrically connected to an X-touch pad corresponding thereto via one or more X-touch lines X-TL. For example, an outermost one of a plurality of X-touch electrodes included in one X-touch electrode line X-TEL is electrically connected to an X-touch pad corresponding thereto via the X-touch line X-TL.

The plurality of Y-touch electrode lines Y-TEL are electrically connected to a Y-touch pad corresponding thereto via one or more Y-touch lines Y-TL. For example, an outermost one of a plurality of Y-touch electrodes included in one Y-touch electrode line Y-TEL is electrically connected to a Y-touch pad Y-TP corresponding thereto via the Y-touch line Y-TL.

Here, when the plural X-touch electrodes constituting the plurality of X-touch electrode lines X-TEL are touch driving electrodes, touch driving signals are supplied to the plurality of X-touch electrodes through the plurality of X-touch lines X-TL. In addition, when the plural Y-touch electrodes constituting the plurality of Y-touch electrode lines Y-TEL are touch sensing electrodes, touch sensing signals generated by the plurality of Y-touch electrodes are transmitted to the touch driving circuit 150 (FIG. 1) through the Y-touch lines Y-TL.

At this time, the plurality of X-touch lines X-TL and the plurality of Y-touch lines Y-TL can extend along a non-display area located outside the display area AA, and the plurality of X-touch lines X-TL and the plurality of Y-touch lines Y-TL can partially overlap each other in the non-display area.

For example, when the plurality of X-touch lines X-TL and the plurality of Y-touch lines Y-TL are formed on different layers in the non-display area, the plurality of X-touch lines X-TL and the plurality of Y-touch lines Y-TL can overlap each other in a partial section outside the display area AA.

At this time, the touch line TL can be configured in a single electrode structure for transmission of a touch signal in an area adjacent to the touch pad, or can be configured in a dual stack structure having connection via at least one contact hole in order to reduce electrical resistance on the touch signal or to prepare for line breakage.

When the touch line TL is configured in a dual stack structure, a touch bridge line extending in the same direction as the touch line TL can be located vertically above the touch line or vertically under the touch line, and one or more contact holes for electrical connection can be formed in the touch line TL and the touch bridge line at predetermined intervals.

On the other hand, in another example, when the plurality of X-touch lines X-TL and the plurality of Y-touch lines Y-TL are formed on the same layer, there may be no overlapping areas.

The touch display device 100 can be used in a mobile device, such as a smartphone or a tablet computer, or can be used in a large-screen display device, such as a vehicle display or an exhibition display.

Particularly, for a large-screen touch display device 100, the length of the touch electrode line TEL constituted by the plurality of touch electrodes is increased as the size of the display pane 110 is increased, whereby there can be a difference in delay of time at which a touch signal (a tough driving signal or a touch sensing signal) is transmitted depending on the position/location of the touch electrode. As a result, in some cases, uniformity in an image displayed through the display panel 110 can be affected.

According to an embodiment of the present disclosure, in order to reduce the time delay of the touch signal, the touch line can be configured in a multi-feeding structure such that a touch signal can be simultaneously applied to the plurality of touch electrodes constituting the same touch electrode line TEL.

Figure 4:
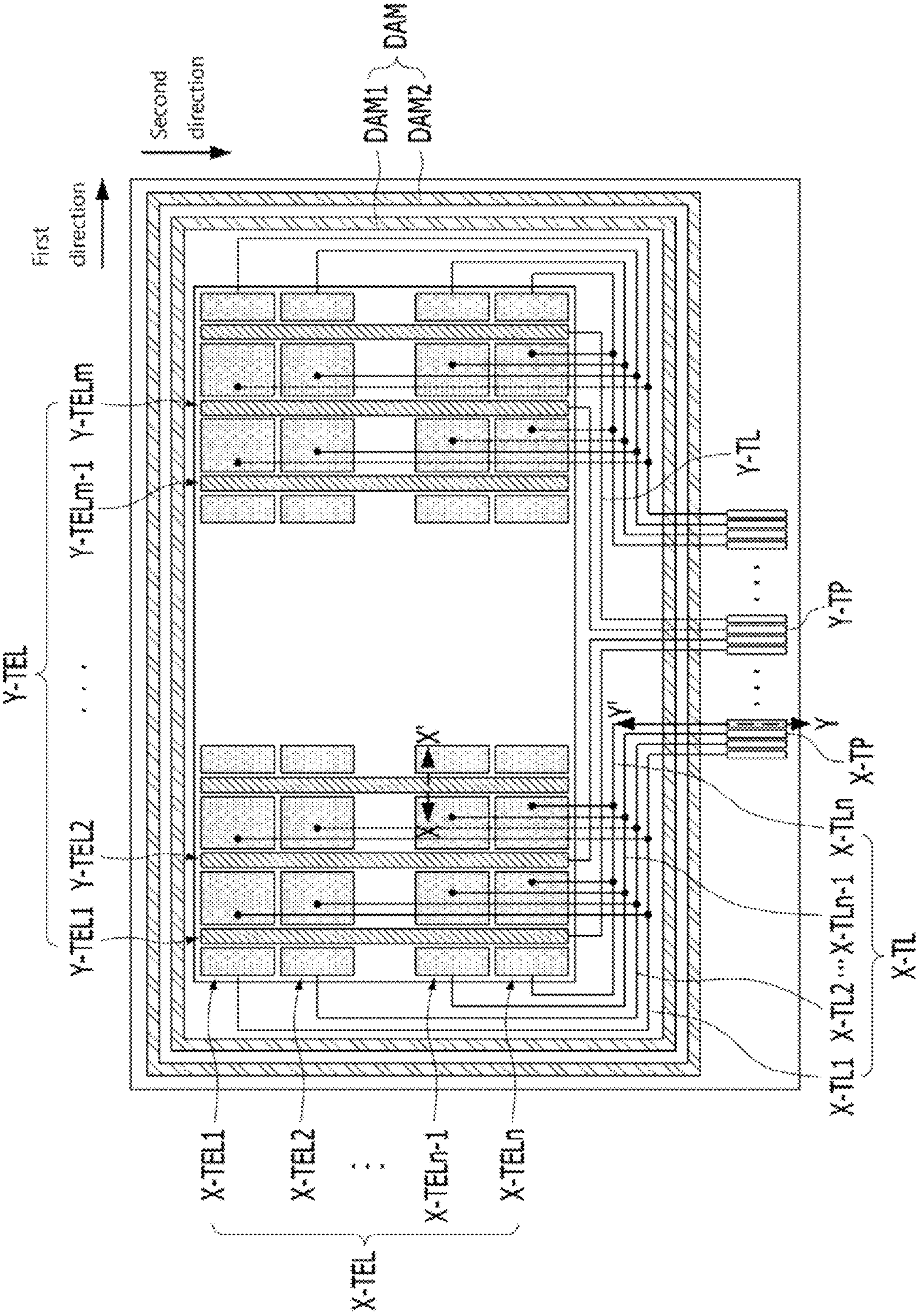
FIG. 4 is a view illustratively showing an example of the touch sensing structure of FIG. 3.

FIG. 4 is a view illustratively showing an example of the touch sensing structure of FIG. 3 being in a multi-feeding structure.

Referring to FIG. 4, in the touch display device 100 according to the embodiment of the present disclosure, the touch line can be configured in a multi-feeding structure such that a touch signal can be simultaneously applied to the plurality of touch electrodes constituting the same touch electrode line TEL in order to reduce the time delay of the touch signal.

At this time, when a plurality of X-touch electrodes arranged in the X-axis direction (first direction in the example of FIG. 4) constitutes one X-touch electrode line X-TEL, the plurality of X-touch electrodes located in the same line can be connected to each other via the same X-touch line X-TL such that a touch signal is simultaneously applied to the plurality of X-touch electrodes constituting the one X-touch electrode line X-TEL.

Alternatively or in addition, when a plurality of Y-touch electrodes arranged in the Y-axis direction (second direction in the example of FIG. 4) constitutes one Y-touch electrode line Y-TEL, the plurality of Y-touch electrodes located in the same line can be connected to each other via the same Y-touch line Y-TL such that a touch signal is simultaneously applied to the plurality of Y-touch electrodes constituting the one Y-touch electrode line Y-TEL.

Here, the case in which each of the X-touch electrode lines X-TEL in the X-axis direction is constituted by a plurality of X-touch electrodes and each of the Y-touch electrode lines Y-TEL in the Y-axis direction is constituted by one Y-touch electrode was described by way of example. Consequently, the plurality of X-touch electrodes arranged in the same row in the X-axis direction can be connected to each other via the same X-touch line X-TL.

For example, an X-touch electrode line X-TELA in a first row can be constituted by a plurality of X-touch electrodes disposed in the first row, and the plurality of X-touch electrodes located in the first row can be electrically connected to a first X-touch line X-TL1, whereby a first touch signal can be simultaneously transmitted thereto.

Consequently, the touch signals are simultaneously applied to all the plurality of X-touch electrodes disposed in the X-axis direction, whereby a delay of the touch signals to the plurality of X-touch electrodes can be reduced or eliminated, and therefore, touch performance over the entire screen of the display panel 110 can be equalized and improved.

For example, when the plurality of X-touch electrodes disposed in the X-axis direction are touch driving electrodes, a plurality of X-touch electrodes constituting one X-touch electrode line X-TEL is electrically connected to each other via the same X-touch line X-TL, and the same touch driving signal can be applied to all such plurality of X-touch electrode at the same timing or simultaneously.

Further, a plurality of X-touch electrode lines X-TEL1, . . . , X-TELn can be electrically connected to X-touch pads X-TP corresponding thereto via X-touch lines X-TL1, . . . , X-TLn, respectively. For example, a plurality of X-touch electrodes included in a first X-touch electrode line X-TEL1 can be electrically connected to an X-touch pad X-TP corresponding thereto via a first X-touch line X-TL1. Here, n can be a natural number such as a positive integer.

In addition or in the alternative, each of the Y-touch electrode lines Y-TEL1, . . . , Y-TELm is constituted by one Y-touch electrode, and therefore each of the Y-touch electrode lines Y-TEL1, . . . , Y-TELm can be electrically connected to a Y-touch pad Y-TP corresponding thereto via one Y-touch line Y-TL. Here, m can be a natural number such as a positive integer.

At this time, in order to connect one touch line to a plurality of touch electrodes constituting the same touch electrode line TEL, a touch line divergence structure can be variously changed.

The plurality of X-touch lines X-TL electrically connected to the plurality of X-touch electrode lines X-TEL can extend to a place at which there is no encapsulation film ENCAP while being disposed on the encapsulation film ENCAP so as to be electrically connected to the plurality of X-touch pads X-TP. The plurality of Y-touch lines Y-TL electrically connected to the plurality of Y-touch electrode lines Y-TEL can extend to a place at which there is no encapsulation film ENCAP while being disposed on the encapsulation film ENCAP so as to be electrically connected to the plurality of Y-touch pads Y-TP. Here, the encapsulation film ENCAP can be located in the active area AA, and can extend to the non-active area NA depending on circumstances.

Meanwhile, as previously described, in order to prevent collapse or deterioration of a certain layer in the active area AA (e.g., an encapsulation film in an organic light emitting display panel), a dam area is an area where the dam DAM is provided, and can be provided at the interface between the active area AA and the non-active area NA or in the non-active area NA, which is an area outside the active area AA. For example, a dam DAM can perform a function of preventing overflow of an organic material layer included in the encapsulation film ENCAP to the outside. Accordingly, the dam DAM can be referred to as a blocking structure.

As shown in FIG. 4, as an example, a primary dam DAM1 and a secondary dam DAM2 can be disposed in the dam area. Here, the secondary dam DAM2 can be located farther outside than the primary dam DAM1.

In another example, only the primary dam DAM1 can be located in the dam area. In another example, one or more additional dams can be further disposed in the dam area in addition to the primary dam DAM1 and the secondary dam DAM2 depending on circumstances.

Meanwhile, referring to FIG. 4, the encapsulation film ENCAP can be located at a side surface of the primary dam DAM1, or the encapsulation film ENCAP can be located at an upper surface of the primary dam DAM1 as well as the side surface of the primary dam DAM1.

Figure 5:
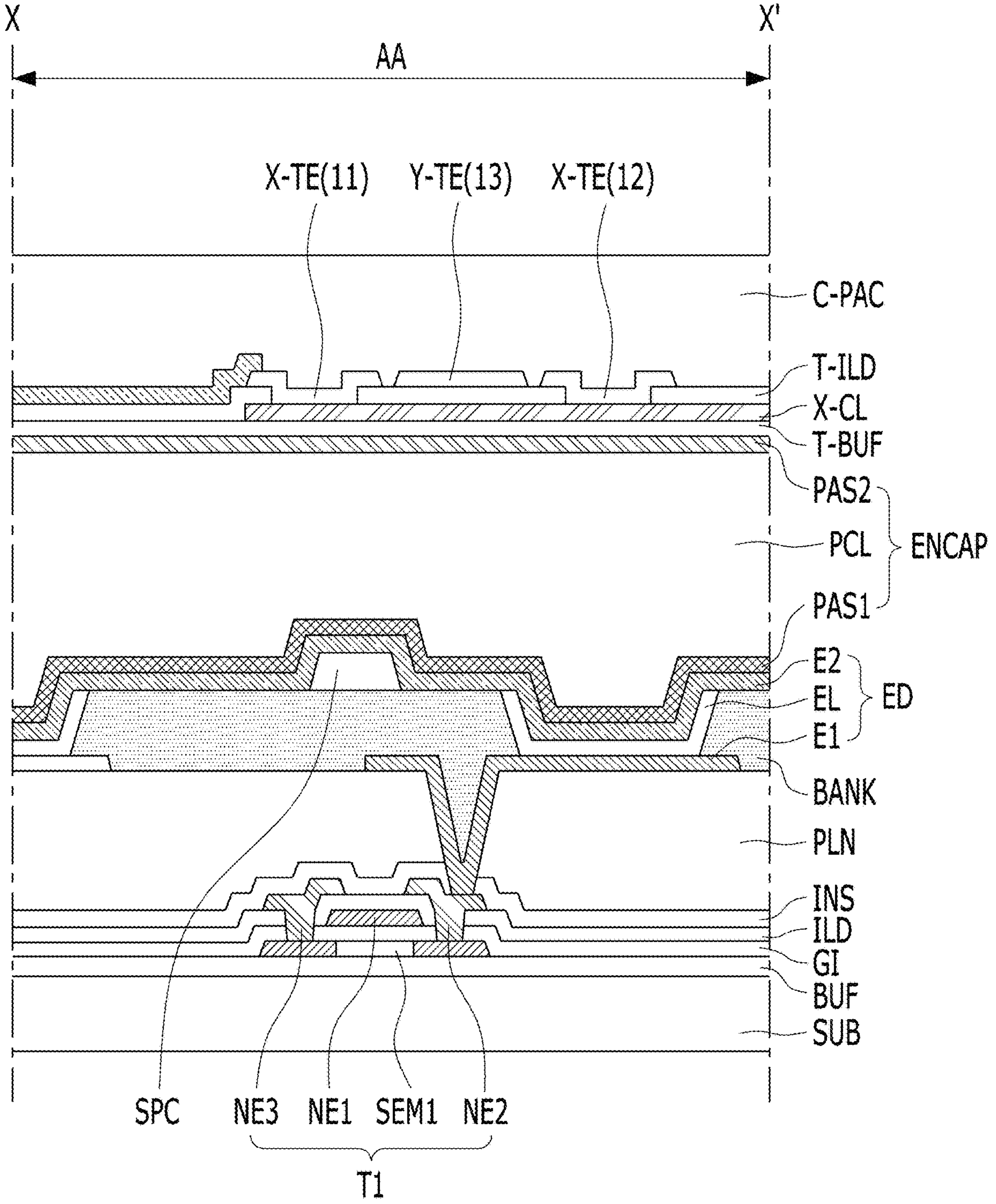
FIG. 5 is a partial sectional view of a display panel according to an embodiment of the present disclosure, illustratively showing a sectional structure taken along line X-X' of FIG. 4.

FIG. 5 is a partial sectional view of a display panel according to an embodiment of the present disclosure, illustratively showing a sectional structure taken along line X-X' of FIG. 4.

In FIG. 5, each touch electrode TE is shown as having a plate shape, which, however, is merely an example. Each touch electrode TE can be a mesh type touch electrode. When each touch electrode TE is a mesh type touch electrode, a hole of the touch electrode TE can be located on an emission area of a subpixel SP.

Referring to FIG. 5, a single-layered or multilayered buffer layer BUF can be disposed on a substrate SUB. The substrate SUB can be made of a flexible material. When the substrate SUB is made of polyimide, the buffer layer BUF can be formed in a single-layered structure made of any one of an inorganic material and an organic material in order to prevent the light emitting element from being damaged by impurities, such as alkaline ions, discharged from the substrate SUB during a subsequent process.

On the other hand, in another example, the buffer layer BUF can be formed in a multilayered structure made of different inorganic materials. In addition, the buffer layer BUF can be formed in a multilayered structure including an organic material layer and an inorganic material layer.

For the buffer layer BUF, the inorganic material layer can include any one of a silicon oxide (SiOx) film, a silicon nitride (SiNx) film, and a silicon oxynitride (SiON) film. The organic material layer can include any one of polyimide, a benzocyclobutene series resin, and polyacrylate. Photoacrylic can be included as an example of polyacrylate.

A first transistor T1, which is a driving transistor configured to drive the light emitting element ED, is disposed at each subpixel SP in the active area AA on the substrate SUB.

The first transistor T1 includes a first node electrode NE1 corresponding to a gate electrode, a second node electrode NE2 corresponding to a source electrode or a drain electrode, a third node electrode NE3 corresponding to the drain electrode or the source electrode, and a semiconductor layer SEM1.

The first node electrode NE1 and the semiconductor layer SEM1 can overlap each other in the state in which a gate insulation film GI is interposed therebetween. The second node electrode NE2 can be formed on an interlayer dielectric layer ILD in contact with one side of the semiconductor layer SEM1, and the third node electrode NE3 can be formed on the interlayer dielectric layer ILD in contact with the other side of the semiconductor layer SEM1.

An insulating layer INS configured to cover the second node electrode NE2, the third node electrode NE3, and a data line can be disposed. The insulating layer INS can be formed in a single-layered structure made of an inorganic material or a multilayered structure made of different inorganic materials. For example, the insulating layer INS can be formed in a single-layered structure made of any one of a silicon oxide (SiOx) film, a silicon nitride (SiNx) film, and a silicon oxynitride (SiON) film, or a multilayered structure made thereof.

A planarization film PLN can be disposed on the insulating layer INS. The planarization film PLN, which protects a lower structure while alleviating a step of the lower structure, can be made of an organic material. The organic material can include any one of polyimide, a benzocyclobutene series resin, and polyacrylate. Photoacrylic can be included as an example of polyacrylate.

A light emitting element ED can include a first electrode E1 corresponding to an anode (or a cathode), an emission layer EL formed on the first electrode E1, and a second electrode E2 formed on the emission layer EL. The second electrode E2 can correspond to the cathode (or the anode).

The first electrode E1 is electrically connected to the second node electrode NE2 of the first transistor T1 exposed through a pixel contact hole formed through the planarization film PLN.

A bank BANK having an opening, through which the first electrode E1 is exposed, can be formed on the planarization film PLN. The opening of the bank BANK can be an area that defines an emission area. The bank BANK can be made of an organic material, such as polyimide, a benzocyclobutene series resin, or polyacrylate.

A spacer SPC can be formed on the bank BANK. The spacer SPC serves to prevent a mask for manufacturing of the emission layer EL from contacting a stack under the spacer SPC. At the time of manufacturing the bank BANK, the spacer SPC can be manufactured simultaneously with the bank BANK using a half-tone mask. Consequently, the spacer SPC can be made of the same material as the bank BANK, and can be integrally formed with the bank BANK.

The spacer SPC can be disposed at any position on the bank BANK. For example, the spacer SPC can be disposed over the entirety of the bank BANK. In this case, the spacer SPC can have a smaller width than the bank BANK. In addition, the spacer SPC can be disposed on the bank BANK while having a larger width than the bank BANK. In this case, the spacer SPC can partially overlap the emission area. In addition, the spacer SPC can be disposed on a part of the bank BANK. For example, the spacer SPC can be disposed over the entirety of the bank BANK surrounding one subpixel, or spacers SPC can be disposed neighboring each other in the state in which one subpixel is interposed therebetween. In addition, spacers SPC can be disposed neighboring each other in the state in which at least two subpixels are interposed therebetween.

The emission layer EL is formed on the first electrode E1 in the emission area provided or defined by the bank BANK. The emission layer EL is formed by stacking a hole-related layer, an emission layer, and an electron-related layer on the first electrode E1 in that order or in the reverse order. The second electrode E2 is formed so as to face the first electrode E1 in the state in which the emission layer EL is interposed therebetween.

The encapsulation film ENCAP is formed on the second electrode E2, and blocks permeation of external moisture or oxygen into the light emitting element ED, which can have a low resistance to external moisture or oxygen.

The encapsulation film ENCAP can have a single layer, or can include a plurality of layers PAS1, PCL, and PAS2, as shown in FIG. 5.

For example, when the encapsulation film ENCAP includes the plurality of layers PAS1, PCL, and PAS2, the encapsulation film ENCAP can include one or more inorganic encapsulation layers PAS1 and PAS2 and at least one organic encapsulation layer PCL. As a concrete example, the encapsulation film ENCAP can be formed in a structure in which a first inorganic encapsulation layer PAS1, an organic encapsulation layer PCL, and a second inorganic encapsulation layer PAS2 are sequentially stacked on the second electrode E2.

Here, the organic encapsulation layer PCL can further include at least one organic encapsulation layer or at least one inorganic encapsulation layer.

The first inorganic encapsulation layer PAS1 is formed on the substrate SUB on which the second electrode E2 corresponding to the cathode is formed so as to be closest to the light emitting element ED. As an example, the first inorganic encapsulation layer PAS1 is made of an inorganic insulating material that can be deposited at a low temperature, such as silicon nitride (SiNx), silicon oxide (SiOx), silicon oxynitride (SiON), or aluminum oxide ($Al_2O_3$). Since the first inorganic encapsulation layer PAS1 is deposited in a low-temperature atmosphere, the first inorganic encapsulation layer PAS1 can prevent damage to the emission layer EL including the organic material that has a low resistance to a high-temperature atmosphere during a deposition process.

The organic encapsulation layer PCL can be formed so as to have a smaller area than the first inorganic encapsulation layer PAS1. In this case, the organic encapsulation layer PCL can be formed so as to expose opposite ends of the first inorganic encapsulation layer PAS1. The organic encapsulation layer PCL can serve to alleviate stress between layers due to a bending of the touch screen-integrated light emitting display device, which can be an organic light emitting display device, and can serve to enhance planarization performance. As an example, the organic encapsulation layer PCL can be made of an organic insulating material, such as an acrylic resin, an epoxy resin, polyimide, polyethylene, or silicon oxycarbide (SiOC).

A touch buffer film T-BUF can be disposed on the encapsulation film ENCAP. The touch buffer film T-BUF can be located between a touch sensor metal including X-touch and Y-touch electrodes X-TE and Y-TE and X-touch and Y-touch electrode connection lines X-CL and Y-CL, and the second electrode E2 of the light emitting element ED. The Y-touch electrodes Y-TE and the Y-touch electrode connection lines Y-CL can be integrated and formed on the encapsulation film ENCAP.

The touch buffer film T-BUF can be designed such that the distance between the touch sensor metal and the second electrode E2 of the light emitting element ED is maintained at a predetermined minimum distance (e.g., 1 μm). Consequently, it is possible to reduce or prevent parasitic capacitance formed between the touch sensor metal and the second electrode E2 of the light emitting element ED, whereby it is possible to prevent or minimize lowering of touch sensitivity due to the parasitic capacitance.

The touch sensor metal including the X-touch and Y-touch electrodes X-TE and Y-TE and the X-touch and Y-touch electrode connection lines X-CL and Y-CL can be disposed on the encapsulation film ENCAP without the touch buffer film T-BUF.

In addition, the touch buffer film T-BUF can block permeation of either chemical liquid (a developer or an etchant) used during the manufacturing of the touch sensor metal disposed on the touch buffer film T-BUF or external moisture into the emission layer EL including the organic material. Consequently, the touch buffer film T-BUF can prevent or minimize damage to the emission layer EL, which has a low resistance to chemical liquid or moisture.

In order to prevent or minimize damage to the emission layer EL including the organic material having a low resistance to high temperature, the touch buffer film T-BUF can be made of an organic insulating material that can be formed at a predetermined temperature (e.g., a low temperature of 100° C. or lower) and that has a low dielectric constant of 1 to 3. For example, the touch buffer film T-BUF can be made of an acrylic-based, epoxy-based, or siloxane-based material. It is possible for the touch buffer film T-BUF, which is made of an organic insulating material and has planarization performance, to prevent or minimize damage to the encapsulation layers PAS1, PCL, and PAS2 constituting the encapsulation film ENCAP and to prevent or minimize breakage of the touch sensor metal formed on the touch buffer film T-BUF due to a bending of the organic light emitting display device.

In the mutual-capacitance-based touch sensor structure, an X-touch electrode line X-TEL and a Y-touch electrode line Y-TEL can be disposed on the touch buffer film T-BUF, and the X-touch electrode line X-TEL and the Y-touch electrode line Y-TEL can intersect each other.

The X-touch electrode line X-TEL can include a plurality of X-touch electrodes X-TE and a plurality of X-touch electrode connection lines X-CL configured to electrically connect the plurality of X-touch electrodes X-TE to each other.

As shown in FIG. 5, the plurality of X-touch electrodes X-TE and the plurality of X-touch electrode connection lines X-CL can be located or formed on different layers in the state in which a touch insulating film T-ILD is interposed therebetween.

The plurality of X-touch electrodes X-TE can be spaced apart from each other by a predetermined distance in the x-axis direction. For example, in the example of FIG. 5, a first X-touch electrode 11 and a second X-touch electrode 12 can extend in the x-axis direction, and can be spaced apart from each other with a Y-touch electrode 13 disposed therebetween. Each of the plurality of X-touch electrodes X-TE can be electrically connected to another X-touch electrode X-TE adjacent thereto in the x-axis direction via a corresponding one of the X-touch electrode connection lines X-CL. For instance, the first and second X-touch electrodes 11 and 12 are electrically connected to each other by being directly connected to the X-touch electrode connection line X-CL disposed under the first and second X-touch electrodes 11 and 12.

Each X-touch electrode connection line X-CL can be formed on the touch buffer film T-BUF, and can be exposed through a touch contact hole formed through the touch insulating film T-ILD so as to be electrically connected to two X-touch electrodes X-TE (e.g., the first and second X-touch electrodes 11 and 12) adjacent to each other in the x-axis direction.

The X-touch electrode connection lines X-CL can be disposed so as to overlap the bank BANK. Consequently, it is possible to prevent a decrease in aperture ratio due to the X-touch electrode connection lines X-CL.

The Y-touch electrode line Y-TEL can include a plurality of Y-touch electrodes Y-TE and a plurality of Y-touch electrode connection lines Y-CL configured to electrically connect the plurality of Y-touch electrodes Y-TE to each other.

On the touch insulating film T-ILD, the plurality of Y-touch electrodes Y-TE can be spaced apart from each other by a predetermined distance in the y-axis direction. Each of the plurality of Y-touch electrodes Y-TE can be electrically connected to another Y-touch electrode Y-TE adjacent thereto in the y-axis direction via a corresponding one of the Y-touch electrode connection lines Y-CL.

The Y-touch electrode connection lines Y-CL can be disposed in the same plane as the Y-touch electrodes Y-TE, and each Y-touch electrode connection line Y-CL can be electrically connected to two Y-touch electrodes Y-TE adjacent to each other in the y-axis direction without a separate contact hole, or can be integrally formed with two Y-touch electrodes Y-TE adjacent to each other in the y-axis direction.

The Y-touch electrode connection lines Y-CL can be disposed so as to overlap the bank BANK. Consequently, it is possible to prevent a decrease in aperture ratio due to the Y-touch electrode connection lines Y-CL.

An organic cover layer C-PAC can be formed so as to cover the touch sensor metal, whereby it is possible to prevent or minimize corrosion of the touch sensor metal due to external moisture. As an example, the organic cover layer C-PAC can be made of an organic insulating material, or can be formed in the form of a circular polarizer or a film made of epoxy or acrylic. The organic cover layer C-PAC may not be provided on the encapsulation film ENCAP in that the organic cover layer C-PAC may not be an essential component and can be an optional layer.

Meanwhile, in the sectional view of FIG. 5, the structure is conceptually shown. Consequently, the position, thickness, or width of each pattern (each layer or each electrode) can be changed depending on the direction in which the structure is viewed or the position thereof, the structure of connection between the patterns can be changed, additional layers can be further provided in addition to the layers shown, and some of the layers shown can be omitted or integrated.

Figure 6:
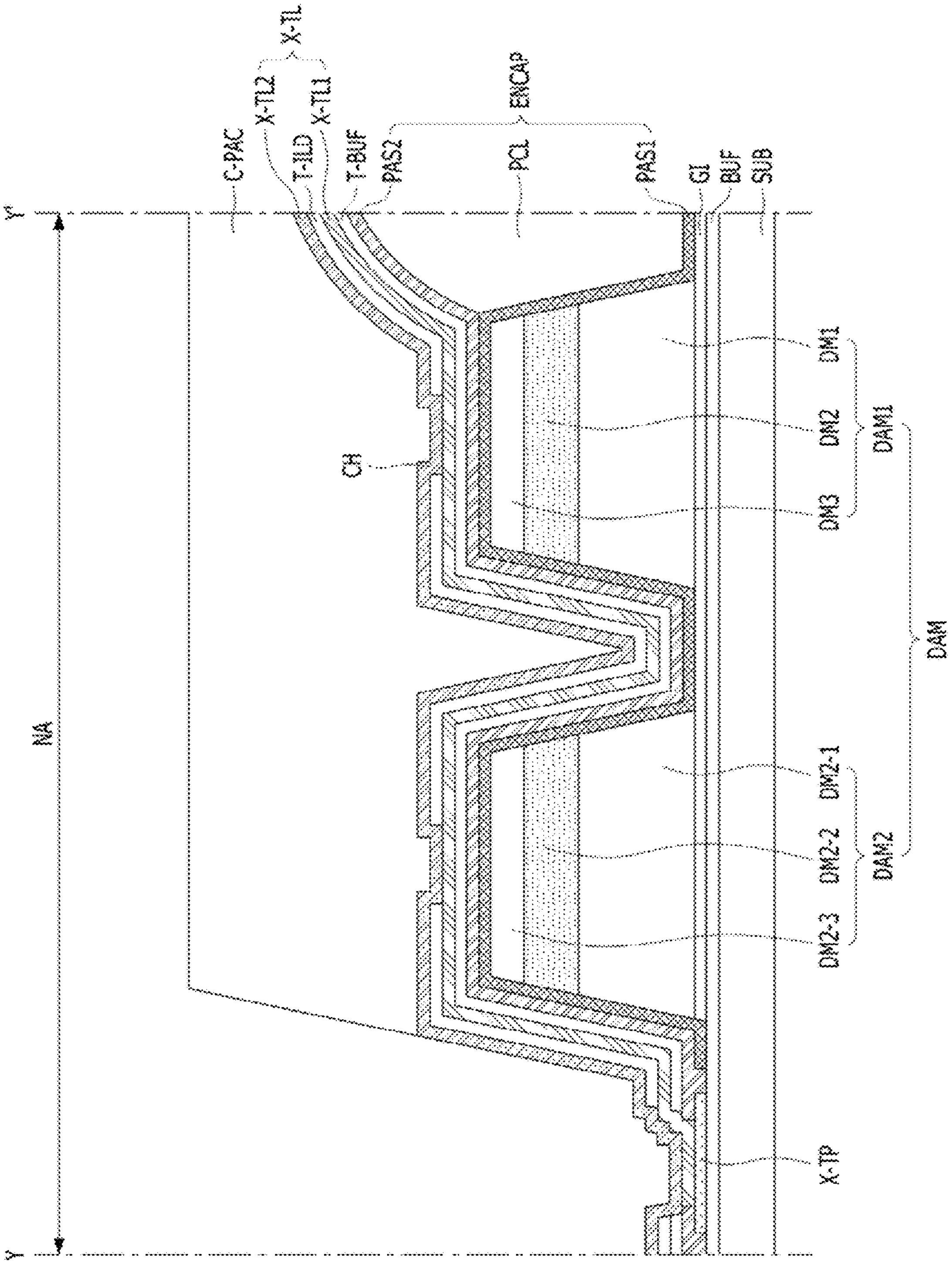
FIG. 6 is a partial sectional view of a display panel according to another embodiment of the present disclosure, illustratively showing a sectional structure taken along line Y-Y' of FIG. 4.

FIG. 6 is a partial sectional view of a display panel according to another embodiment of the present disclosure, illustratively showing a sectional structure taken along line Y-Y' of FIG. 4. The components of FIG. 6 denoted by the same reference symbols as those of FIG. 5 are identical or substantially identical to those described with reference to FIG. 5, and therefore a duplicate description thereof will be omitted or may be briefly described.

Referring to FIG. 6, the dam or blocking structure (DAM) disposed in the non-display area of FIG. 4 and configured to surround the display area can be included. As previously described, in order to prevent a collapse or deterioration of a certain layer in the active area AA (e.g., an encapsulation film in an organic light emitting display panel), the dam area having the dam DAM can be provided at the interface between the active area AA and the non-active area NA or in the non-active area NA, which is an area outside the active area AA. For example, the dam DAM can perform a function of preventing overflow of an organic material layer included in the encapsulation film ENCAP to the outside. As an example, the primary dam DAM1 and the secondary dam DAM2 can be disposed in the dam area. Here, the secondary dam DAM2 can be located farther outside than the primary dam DAM1.

The primary dam DAM1 and/or the secondary dam DAM2 can be formed in a single-layered structure or a multilayered structure. For example, the primary dam DAM1 and/or the secondary dam DAM2 can be made of the same material as at least one of the planarization film PLN, the bank BANK, and the spacer SPC, and can be formed simultaneously therewith. In this case, a dam structure can be formed without a mask addition process and cost increase. For example, FIG. 6 shows that the primary dam DAM1 has three layers DM1/DM2/DM3 and the secondary dam DAM2 has three layers DM2-1/DM2-2/DM2-3. The first layers DM1 and DM2-1 can be made of or can extend from the planarization film PLN. The second layers DM2 and DM2-2 can be made of or can extend from the bank BANK, and the third layers DM3 and DM2-3 can be made of or can extend from the spacer SPC.

In addition, as shown in FIG. 6, the organic encapsulation layer PCL including the organic material can be located only inside the primary dam DAM1.

The X-touch line X-TL disposed on the encapsulation film ENCAP so as to be connected to the plurality of X-touch electrodes X-TE can be included. The X-touch line X-TL can include one or more touch lines which can be composed of an extension of the X-touch electrode X-TE and the X-touch electrode connection line X-CL, where the extension of the X-touch electrode X-TE is connected to the plurality of X-touch electrodes X-TE. The X-touch line X-TL can be electrically connected to the touch driving circuit TDC (e.g., 150 in FIG. 1) via the X-touch pad X-TP. Here, the X-touch electrode connection line X-CL and the extension of the X-touch electrode X-TE, which form the X-touch line X-TL shown in FIG. 6, can be referred to as a first touch line and a second touch line, respectively.

In the same or similar manner, the Y-touch line Y-TL disposed on the encapsulation film ENCAP so as to be connected to the plurality of Y-touch electrodes Y-TE can be included. The Y-touch line Y-TL can include one or more touch lines which can be composed of an extension of the Y-touch electrode Y-TE and the Y-touch electrode connection line Y-CL, where the extension of the Y-touch electrode Y-TE can be connected to the plurality of Y-touch electrodes Y-TE. At this area, the Y-touch electrode connection line Y-CL can be located in the same plane as the X-touch electrode connection line X-CL, and the extension of the Y-touch electrode Y-TE can be located in the same plane as the extension of the X-touch electrode X-TE. The Y-touch line Y_TL can be electrically connected to the touch driving circuit TDC via the Y-touch pad Y-TP. Here, the Y-touch electrode connection line Y-CL and the extension of the Y-touch electrode Y-TE, which form the Y-touch line Y-TL in connection with FIG. 6, can be referred to as a third touch line and a fourth touch line, respectively.

The touch insulating film T-ILD can be disposed between the X-touch electrode connection line X-CL and the extension of the X-touch electrode X-TE. The touch insulating film T-ILD can include a contact hole CH on the blocking structure DAM. The X-touch electrode connection line X-CL and the extension of the X-touch electrode X-TE can be connected to each other via the contact hole CH. The extension of the Y-touch electrode Y-TE and the Y-touch electrode connection line Y-CL of the Y-touch line Y-TL can be electrically connected to each other on the blocking structure DAM.

The X-touch electrode connection line X-CL disposed under the plurality of X-touch electrodes X-TE in the display area in order to connect the plurality of X-touch electrodes X-TE to each other can be provided in the non-active area NA.

The touch buffer film T-BUF between the X-touch electrode connection line X-CL and the encapsulation film ENCAP can be further included. The touch buffer film T-BUF can be located between the touch sensor metal including the X-touch and Y-touch electrodes X-TE and Y-TE and the X-touch and Y-touch electrode connection lines X-CL and Y-CL, and the second electrode E2 of the light emitting element ED.

The touch buffer film T-BUF can be designed such that the distance between the touch sensor metal and the second electrode E2 of the light emitting element ED is maintained at the predetermined minimum distance (e.g., 1 μm). Consequently, it is possible to reduce or prevent parasitic capacitance which may be formed between the touch sensor metal and the second electrode E2 of the light emitting element ED, whereby it is possible to prevent lowering of touch sensitivity due to the parasitic capacitance.

As a variation, the touch sensor metal including the X-touch and Y-touch electrodes X-TE and Y-TE and the X-touch and Y-touch electrode connection lines X-CL and Y-CL can be disposed on the encapsulation film ENCAP without the touch buffer film T-BUF.

In addition, according to the present disclosure, the touch buffer film T-BUF can block permeation of chemical liquid (a developer or an etchant) used during the manufacturing of the touch sensor metal disposed on the touch buffer film T-BUF or external moisture into the emission layer EL including the organic material. Consequently, the touch buffer film T-BUF can prevent damage to the emission layer EL, which has a low resistance to chemical liquid or moisture.

In order to prevent or minimize damage to the emission layer EL including the organic material having the low resistance to high temperature, the touch buffer film T-BUF can be made of an organic insulating material that can be formed at a predetermined temperature (e.g., a low temperature of 100° C. or lower) and that has a low dielectric constant of 1 to 3. For example, the touch buffer film T-BUF can be made of an acrylic-based, epoxy-based, or siloxane-based material. It is possible for the touch buffer film T-BUF, which is made of the organic insulating material and has planarization performance, to prevent damage to the encapsulation layers PAS1, PCL, and PAS2 constituting the encapsulation film ENCAP and to prevent breakage of the touch sensor metal formed on the touch buffer film T-BUF due to a bending of the organic light emitting display device.

Since the dam DAM performs a function of preventing overflow of the organic encapsulation layer PCL included in the encapsulation film ENCAP to the outside, as described above, it is possible to more easily control the overflow of the organic encapsulation layer PCL as the height of the dam DAM is further increased.

According to the embodiment of the present disclosure, when the contact hole CH is formed in the touch insulating film T-ILD corresponding to the upper part of the dam DAM, which is a high-step area, and patterning is performed to form the extension of the X-touch electrode X-TE (FIG. 6), it is possible to minimize a phenomenon in which the photoresist PR flows down onto the metal of the extension of the X-touch electrode X-TE, whereby it is possible to prevent damage to the extension of the X-touch electrode X-TE due to the etchant.

A touch display device according to an embodiment of a present disclosure can comprise a substrate having a display area in which a plurality of pixels are disposed and a non-display area around the display area, a blocking structure at the non-display area, the blocking structure to surround the display area, an encapsulation film to cover the display area and the non-display area, a plurality of first touch electrodes and a plurality of second touch electrodes on the encapsulation film in the display area, the plurality of first touch electrodes extending in a first direction, the plurality of second touch electrodes extending in a second direction, a first touch line on the encapsulation film in the non-display area, the first touch line connected to the plurality of first touch electrodes, and a second touch line on the first touch line, the second touch line connected to the plurality of first touch electrodes, a touch insulating film between the first touch line and the second touch line, the touch insulating film comprising a contact hole on the blocking structure. The first touch line and the second touch line can be connected to each other via the contact hole.

A touch display device according to an embodiment of a present disclosure can further comprise a first touch electrode connection line disposed under the plurality of first touch electrodes, the first touch electrode connection line to connect the plurality of first touch electrodes to each other.

A touch display device according to an embodiment of a present disclosure can further comprise a touch buffer film between the first touch electrode connection line and the encapsulation film.

A touch display device according to an embodiment of a present disclosure can further comprise a third touch line disposed on the encapsulation film in the non-display area, the third touch line connected to the plurality of second touch electrodes, and a fourth touch line disposed on the third touch line, the fourth touch line connected to the plurality of second touch electrodes.

In a touch display device according to an embodiment of a present disclosure, the third touch line can be located in an identical plane to the first touch line.

In a touch display device according to an embodiment of a present disclosure, the fourth touch line can be located in an identical plane to the second touch line.

In a touch display device according to an embodiment of a present disclosure, the third touch line and the fourth touch line can be electrically connected to each other on the blocking structure.

In a touch display device according to an embodiment of a present disclosure, the first touch line can be disposed in an identical plane to the first touch electrode connection line and is made of a same material as the first touch electrode connection line.

In a touch display device according to an embodiment of a present disclosure, the second touch line can be disposed in an identical plane to the first touch electrodes and is made of a same material as the first touch electrodes.

In a touch display device according to an embodiment of a present disclosure, the contact hole can overlap the blocking structure.

In a touch display device according to an embodiment of a present disclosure, the blocking structure can comprise a first blocking structure and a second blocking structure located farther from the display area than the first blocking structure.

In a touch display device according to an embodiment of a present disclosure, the contact hole can overlap at least one of the first blocking structure and the second blocking structure.

As is apparent from the above description, in a display device according to embodiments of the present disclosure, a contact hole is formed through a touch insulating film located between a first touch line and a second touch line on a dam overlapping a touch line in a non-display area, whereby it is possible to prevent a phenomenon in which pattern defects occur due to unintentional etching of the touch line on the dam during a mask process for touch line formation, and therefore it is possible to minimize lowering in touch performance.

Effects obtainable from the present disclosure are not limited by the above mentioned effects, and other unmentioned effects can be clearly understood from the above description by those having ordinary skill in the technical field to which the present disclosure pertains.

While the embodiments of the present disclosure have been described with reference to the accompanying drawings, the present disclosure is not limited to the embodiments and can be embodied in various different forms, and those skilled in the art will appreciate that the present disclosure can be embodied in specific forms other than those set forth herein without departing from the technical idea and essential characteristics of the present disclosure. The disclosed embodiments are therefore to be construed in all aspects as illustrative and not restrictive.

What is claimed is:

1. A display device comprising:

a display area on a substrate and a non-display area located outside the display area on the substrate;

a transistor in the display area;

a planarization film on the transistor;

a light emitting element on the planarization film in the display area and connected to the transistor, the light emitting element including a first electrode, a second electrode, and an emission layer between the first electrode and the second electrode;

an encapsulation film on the light emitting element;

at least two dams disposed along a periphery of the display area;

a touch buffer film on the encapsulation film;

a touch insulating film on the touch buffer film;

a touch electrode on the touch insulating film; and a touch electrode connection line disposed under the touch electrode and configured to connect to the touch electrode, wherein the touch electrode and the touch electrode connection line cross over the at least two dams, and the touch electrode and the touch electrode connection line are electrically connected to each other in the non-display area via at least two contact holes.

2. The display device of claim 1, further comprising a touch pad electrically connected to the touch electrode via a touch line composed of an extension of at least one of the touch electrode and the touch electrode connection line.

3. The display device of claim 2, wherein the encapsulation film includes a first inorganic encapsulation film, a second inorganic encapsulation film, and an organic encapsulation film disposed therebetween, and wherein the first inorganic encapsulation film, the second inorganic encapsulation film, the touch buffer film, and the touch insulating film extend beyond the at least two dams to the touch pad.

4. The display device of claim 2, wherein the touch line includes a first portion that is intersecting with the at least two dams and a second portion that is disposed parallel to the at least two dams between the at least two dams and the display area.

5. The display device of claim 2, wherein the touch line is plural, and a first touch line and a second touch line extend along the non-display area located outside the display area and partially overlap each other in the non-display area.

6. The display device of claim 5, wherein the first touch line and the second touch line are formed on different layers in the non-display area.

7. The display device of claim 2, wherein the at least one of the touch electrode and the touch electrode connection line contacts the touch pad as the touch line.

8. The display device of claim 1, wherein the touch electrode and the touch electrode connection line extend beyond the at least two dams and along top and side surfaces of the at least two dams.

9. The display device of claim 1, wherein the at least two dams are located at an interface between the display area and the non-display area, or in the non-display area.

10. The display device of claim 1, wherein the at least two dams include a first dam and a second dam, the second dam being located outside the first dam.

11. The display device of claim 1, wherein the substrate includes a flexible material.

12. The display device of claim 1, wherein the at least two contact holes are separated from each other by a distance.

13. The display device of claim 1, wherein the at least two contact holes are located in the touch insulating film.

14. A display device comprising:

a display area on a substrate and a non-display area located outside the display area on the substrate;

a transistor in the display area in the display area;

a planarization film on the transistor;

a light emitting element on the planarization film in the display area and connected to the transistor, the light emitting element including a first electrode, a second electrode, and an emission layer between the first electrode and the second electrode;

an encapsulation film on the light emitting element;

at least two dams disposed along a periphery of the display area;

a touch buffer film on the encapsulation film;

a touch insulating film on the touch buffer film;

a touch electrode on the touch insulating film; and a touch electrode connection line disposed under the touch insulating film, and configured to connect to the touch electrode, wherein the touch electrode and the touch electrode connection line are electrically connected to each other in the non-display area via at least two contact holes.

15. The display device of claim 14, further comprising a touch pad electrically connected to the touch electrode via a touch line composed of an extension of at least one of the touch electrode and the touch electrode connection line.

16. The display device of claim 15, wherein the touch line is plural and includes a first touch line and a second touch line, and wherein the first touch line and the second touch line are formed on different layers in the non-display area.

17. The display device of claim 14, wherein the touch electrode and the touch electrode connection line extend beyond the at least two dams and along top and side surfaces of the at least two dams.

18. A display device comprising:

a display area on a substrate and a non-display area located outside the display area on the substrate;

a transistor in the display area in the display area;

a planarization film on the transistor;

a light emitting element on the planarization film in the display area and connected to the transistor, the light emitting element including a first electrode, a second electrode, and an emission layer between the first electrode and the second electrode;

an encapsulation film on the light emitting element;

at least two dams disposed along a periphery of the display area;

a touch buffer film on the encapsulation film;

a touch insulating film on the touch buffer film;

a touch electrode on the touch insulating film; and a touch electrode connection line disposed under the touch insulating film, and configured to connect to the touch electrode, wherein a first touch line and a second touch line are composed as extensions of at least one of the touch electrode and the touch electrode connection line, and extend as a double layer toward a touch pad in the non-display area, and wherein the touch insulation film is interposed between the first touch line and the second touch line.

19. The display device of claim 18, wherein the touch electrode and the touch electrode connection line are electrically connected to each other in the non-display area via at least two contact holes.

20. The display device of claim 18, wherein at least one of the first touch line and the second touch line does not contact the touch pad.

* * * * *